United States Patent [19]

Watson

[11] Patent Number: 4,668,383

[45] Date of Patent: May 26, 1987

[54] MAGNETIC SEPARATOR

[75] Inventor: James H. P. Watson, Cornwall, England

[73] Assignee: Cyrogenic Consultants Limited, London, England

[21] Appl. No.: 716,905

[22] Filed: Mar. 28, 1985

[30] Foreign Application Priority Data

Mar. 28, 1984 [GB] United Kingdom ................. 8408002

[51] Int. Cl.[4] .......................... B03C 1/02; B01D 35/06

[52] U.S. Cl. .................................... 209/216; 209/213; 209/232; 210/222

[58] Field of Search ............... 209/8, 39, 40, 212-215, 209/223.1, 223.2, 224, 230, 232, 216, 225, 226, 227; 210/222, 223, 695

[56] References Cited

U.S. PATENT DOCUMENTS

| | | | |
|---|---|---|---|
| 2,074,085 | 3/1937 | Frantz | 209/224 |
| 3,627,678 | 12/1971 | Marston et al. | 210/222 X |
| 3,676,337 | 7/1972 | Kolm | 210/695 |
| 3,838,773 | 10/1974 | Kolm | 209/223.1 X |
| 4,144,163 | 3/1979 | Kolm | 209/214 X |
| 4,352,730 | 10/1982 | Dijkhuis | 209/8 |
| 4,526,681 | 7/1985 | Friedlaender et al. | 209/232 X |

*Primary Examiner*—Randolph A. Reese

*Assistant Examiner*—Edward M. Wacyra

*Attorney, Agent, or Firm*—Franklin D. Wolffe; Morris Fidelman

[57] ABSTRACT

A magnetic separator for separating relatively magnetic particles from relatively non-magnetic particles comprises a superconducting magnet providing a uniform magnetic field and a current carrying conductor dispersed in the field such that relatively magnetic particles are captured by the conductor. The current conductor is in the form of a matrix having either randomly, radially, spirally or parallelly set pairs of wires.

16 Claims, 15 Drawing Figures

MAGNETIC SEPARATOR

This invention relates to a magnetic separator.

For many years magnetic separation has been used by the manufacturing and the mineral processing industries on a large scale. Magnetic separation is achieved by the combination of a magnetic field and a field gradient. Electromagnets in conjunction with an iron circuit have been used to generate the magnetic field in an air-gap. Field gradients are produced by shaping the poles or by using secondary poles. Secondary poles consist of pieces of shaped ferromagnetic material introduced into the air-gap. The magnetic induction produced in the air-gap in an iron circuit is limited to about 2 T if the separation zone is to be reasonably large in volume compared with the volume of the magnetic circuit. The magnetisable particles processed by these machines are separated by being deflected by the magnetic field configuration or they are captured by the secondary poles. The particles are released from the secondary poles by either switching off the magnetic field or by removing the secondary poles from the field. With particles which are large or strongly magnetic separation can be accomplished with electromagnets which consume modest amounts of electric power.

Within the last fifteen years so-called high intensity magnetic separators or high gradient magnetic separators have been developed which have made it possible to extract weakly magnetic colloidial particles from a fluid, liquid or gas, which carried them through the separator. High gradient magnetic separators have been developed for, and in collaboration with, the kaolin clay industry in the United States. These separators consist of an iron-bound solenoid which provides a magnetic field within the solenoid of up to 2 T. This space is filled with a fine ferromagnetic wire matrix acting as a fine secondary pole system and which occupies approximately 5–10% of the solenoidal space. The radius of the wire is chosen to meet the needs of the separation process but in the case of clay processing Type 430 stainless steel is used with a strand radius of commonly 70–80μm. Field gradients as high as 0.1 T/μm can be achieved. This wire matrix is usually held in the solenoidal magnetic field space within a canister through which slurries can be pumped. This kind of separation system has been described in U.S. Pat. No. 3,677,678. The use of a finely divided matrix was previously suggested in U.S. Pat. No. 2,074,085, but this system differs mainly on two counts, firstly, pole caps are used to keep the field uniform within the solenoidal space and applied magnetic fields are used which are much higher than required to saturate magnetisation of the matrix (see U.S. Pat. No. 3,676,337).

In this method as described in U.S. Patent No. 3,627,678, a slurry containing paramagnetic particles to be extracted is passed through the matrix of fine ferromagnetic wire which is magnetised by the externally applied magnetic field. The paramagnetic particles are attracted to and held onto the wires by magnetic forces. Eventually the efficiency of the trapping process becomes reduced by the accumulation of the captured particles. These trapped particles can be released and the efficiency of the matrix restored by switching off the magnetic field or by withdrawing the matrix from the magnetic field and washing the particles from the matrix. Thus the high gradient magnetic separation is a cyclical process with a collection phase and a washing phase. The machines of this type operating in the clay industry are essentially batch machines. The solenoid weighs about 200–250 tonnes with copper coils weighing about 60 tonnes. The power level required to generate the 2 T within a 2 m, or sometimes larger, solenoidal space is approximately 0.5 MW. The switch off time and the switch on time of these systems are typically 75 sec so that for high efficiency the feed part of the cycle must be much longer than 150 sec.

Using refrigerated superconducting solenoids it is possible to produce very high magnetic fields without power loss within the solenoid. The only power required is for refrigeration which can be between 10 to 100 times smaller than the power required for field generation in the coils used in the machines. The potential saving of power has therefore produced much of the interest in the use of superconducting systems.

A number of designs of superconducting magnetic separators have been proposed but all of them have some drawback. Perhaps having a poor duty factor, an expensive magnet configuration, poor selectivity, the ability to work effectively only at large particle size or the ability to work only in a limited range of magnetic susceptibility, for example, perhaps ferromagnetic materials and weakly paramagnetic material cannot be handled by the machine. In other cases perhaps complex mechanical engineering is required for sliding seals, rotating drums or reciprocating canister trains.

In accordance with the invention a magnetic separator for separating relatively magnetic particles from relatively non-magnetic particles comprises a magnet providing a uniform magnetic field and a current carrying wire disposed in the field such that relatively magnetic particles are captured.

Preferably the magnetic separator uses a superconducting high gradient magnet whereby the wires trap weakly magnetic particles from a fluid, either liquid or gas, which carries the particles through a wire matrix. High processing rates and high selectivity of material in magnetic susceptibility and in particle size can be achieved with low power input. A wide range of susceptibility material can be treated simultaneously. This separator has no moving parts. The particles can be released from the wires and the system works equally well for ferromagnetic, paramagnetic or diamagnetic particles.

In order to appreciate certain aspects of the invention, the theory of capture by current carrying wires is hereby examined.

THEORY OF PARTICLE CAPTURE

Figure 1:
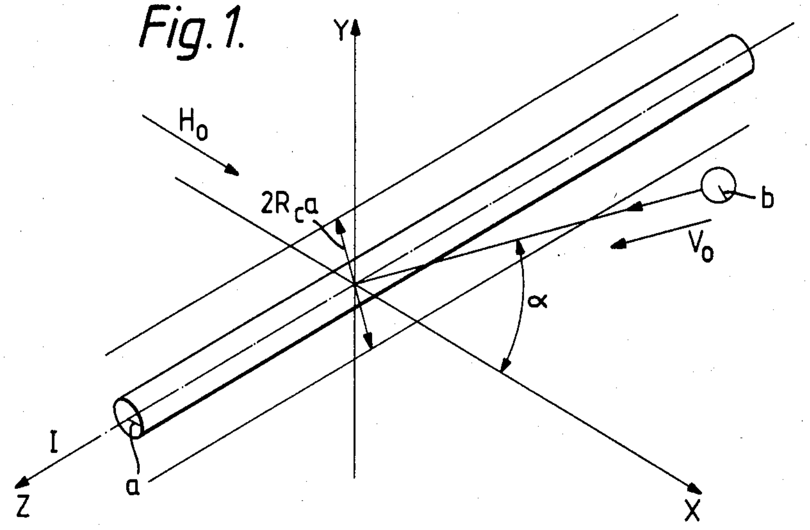
FIG. 1 shows a current carrying wire within a magnetic field.

Consider a wire of radius a carrying an electric current I situated along the Z axis, as shown in FIG. 1. The magnetic field is applied along the X axis and the flow of the fluid is in a direction which makes an angle $\alpha$ with the X axis and also perpendicular to the Z axis. The capture cross section of the wire is $2R_c a$ per unit length of the wire.

Figure 2:
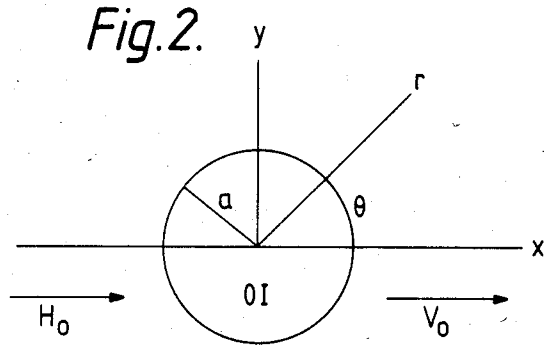
FIG. 2 showns the magnetic field in cylindrical coordinates.

The magnetic field H in the vicinity of the wire, using cylindrical coordinates shown in FIG. 2, is given by $$\underset{\sim}{H}=(H_o\cos\theta,\ -H_o\sin\theta+I/2\pi r,\theta) \tag{1}$$

The magnetic generated traction force on a small particle of $V_p(=(4/3)\ b^3)$, assuming that the demagnetising field within the particle can be neglected, is given by $F_{\underset{\sim}{m}}$ $$F_{\underset{\sim}{m}}=(4/3)\pi b^3\mu_o\chi\nabla(H^2)/2 \tag{2}$$

where the permeability of free space $\mu_o=4\pi\cdot 10^{-7}$ h/m and $\chi=\chi_p-\chi_f$ where $\chi_p$, $\chi_f$ are the magnetic susceptibilities of the particle and the fluid respectively. Using equation (1) and (2) the following expression for $F_{\underset{\sim}{m}}$ is obtained.

$$F_{\underset{\sim}{m}}=(2\mu_o/3/a^2)H_oI\ G(r_a,\ \theta) \tag{3}$$

$$\underset{\sim}{G}(r_a,\theta)=(\sin\theta/r_a^2-I/H_oar_a^3)\underset{\sim}{e}_r-\cos\underset{\sim}{e}_\theta/r_a^2 \tag{4}$$

where $r_a=r/a$ and $e_r$ and e are unit vectors shown in FIG. 2.

If it is assumed that the drag due to the relative motion between the particle and the fluid $F_D$ is given by Stokes formula then $F_D$ is given by $$\underset{\sim}{F_D}=6b\left(\underset{\sim}{V_f}-\frac{dr}{dt}\right) \tag{5}$$

where $V_f$ is the velocity of the fluid and $\eta$ is the fluid viscosity.

In fluid such as water the inertial terms in the equation of motion for particles carried by a fluid past the wire can be neglected. More quantitatively the condition is that the term $(1/9)(\rho_P/\rho_L)(b^2/a^2)R_d << 1$ where $R(=\rho_L V_o a/\eta)$ is the Reynolds number of the wire, $V_o$ is the background velocity of the fluid far away from the wire and $\rho_L$ is the fluid density. This method is not restricted to situations where the inertial terms are neglected but the analysis without the inertial term is simpler and extension to include inertia is unlikely to produce results radically different from those presented here. Further, in the cases where inertial terms are important the wire capture cross-section $2R_c$ a is larger than the values determined when inertia is neglected, other conditions being the same.

The particle equation of motion can be written as $$\underset{\sim}{F_m}+F_D=o \tag{6}$$

So $$\frac{dr_a}{dt}=(V_m/a)(\underset{\sim}{G}(r_a,)+\underset{\sim}{V_f}/a \tag{7}$$

where $V_m$, the magnetic velocity, is given by $$V_m=(\mu_o/9\pi)\chi b^2\ (H_oI/\eta_a^2)$$

An examination of equation (7) reveals that the particle trajectory only depends on $\cdot V_m/V_o$ provided that $I/\eta H_o\ a<<1$. In the cases to be discussed here, $I/\pi\ H_oa\lesssim 10^{-3}$ and therefore this term will be neglected.

(a) Field $H_o$ and flow $V_o$ parallel

If the flow is along the x axis then the equations of motion become, assuming inviscid potential flow around the wire, $$\left.\begin{aligned}\frac{dx_a}{dt}&=\left(\frac{1}{ar_a^2}\right)(V_m\sin 2\theta+V_o(r_a^2-\cos 2\theta))\\ \frac{dy_a}{dt}&=-\left(\frac{1}{ar_a^2}\right)(V_m\cos 2\theta-V_o\sin 2\theta)\end{aligned}\right\} \tag{9}$$

If the current is arranged to flow in the positive Z direction with $H_o$ in the x direction then particle will only be captured on the side of the wire with $y_a<1$, that is for angles $\theta$ such that $-\pi<\theta<O$. If the current is reversed capture will take place on the upper.

Equation (9) has been solved by numerical integration with the particles far from the wire at large negative x co-ordinates for various values of the initial co-ordinate $y_{ai}$. For $y_{ai}>O$ there is a limiting value which results in capture $y_{lin}(+)$ such that if $y_{ai}>y_{lin}(+)$ then the particle is not captured. Similarly there is a value of $y_{ai}=y_{lin}(-)$ for $y_{ai}<O$ such that if $y_{ai}<y_{lin}(-)$ the particle escapes. For a value of $y_{ai}$ such that $y_{lin}(-)<y_{ai}<$ ylin $(+)$ the particle is captured. The capture radius $R_c$ is defined by the relationship $2R_c=|y_{lin}(-)|+|y_{lin}(+)|$. In certain configurations to be discussed below the wires will be embedded in a wall such that flow is restricted to the lower half plane, the appropriate value of $R_c$ in this case is $R_c=|y_{lin}(+)|$.

Figure 3:
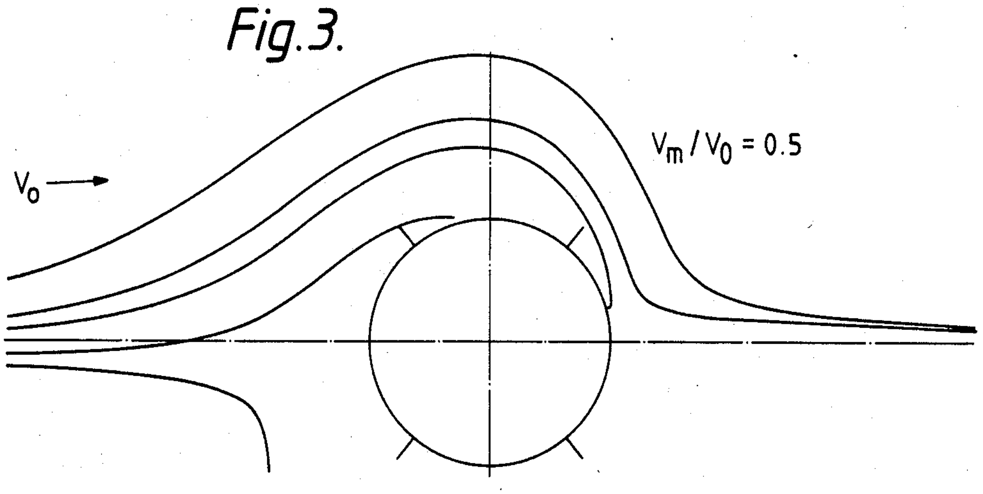
FIG. 3, 5, 6 and 8 show sets of particles flow trajectories.

In FIG. 3 a typical set of particle trajectories is shown for a particular value of $V_m/V_o$ again it has been assumed that the term $I/\pi H_o$ a can be neglected. As can be seen there is a considerable assymmetry between positive and negative values of $y_{ai}$.

Figure 4:
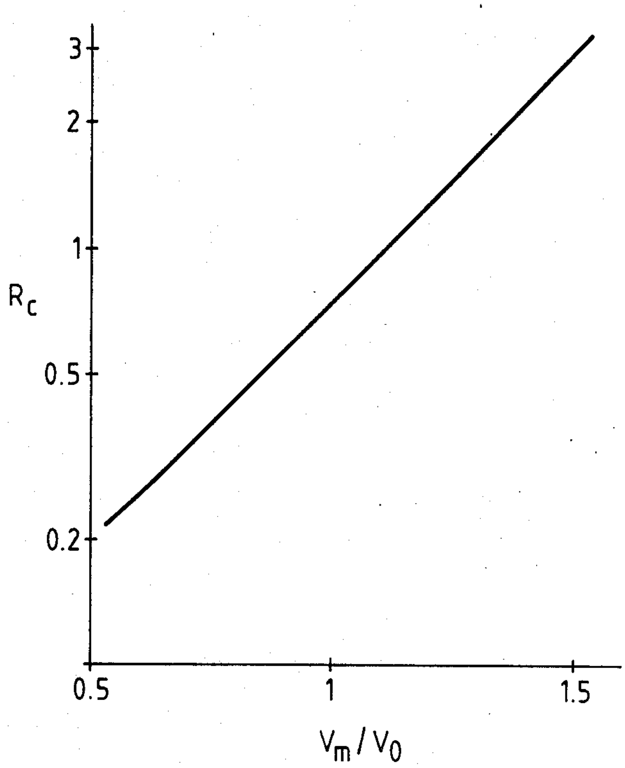
FIG. 4 and 7 show plots of capture radius to fluid velocity.

In FIG. 4 $R_c$ for the full wire is plotted versus $V_m/V_o$. The value of $R_c$ is independent of the direction of the current flow as all the trajectories are simply reflected in the x axis.

(b) Field $H_o$ and flow $V_o$ perpendicular

If the field $H_o$ is applied along the x axis and the flow is in the positive y direction then the equations of motion can be written where I in the Z direction is positive $$\left.\begin{aligned}\frac{dx_a}{dt}&=\left(\frac{V_m-V_o}{ar_a^2}\right)\sin 2\theta\\ \frac{dy_a}{dt}&=\frac{V_o}{a}-\frac{(V_m-V_o)\cos 2\theta}{ar_a^2}\end{aligned}\right\} \tag{10}$$

Figure 5:
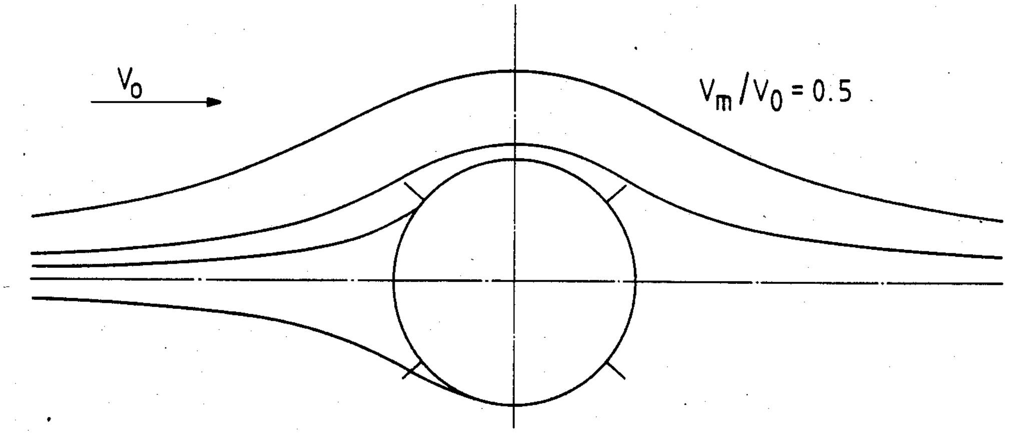
Figure 6:
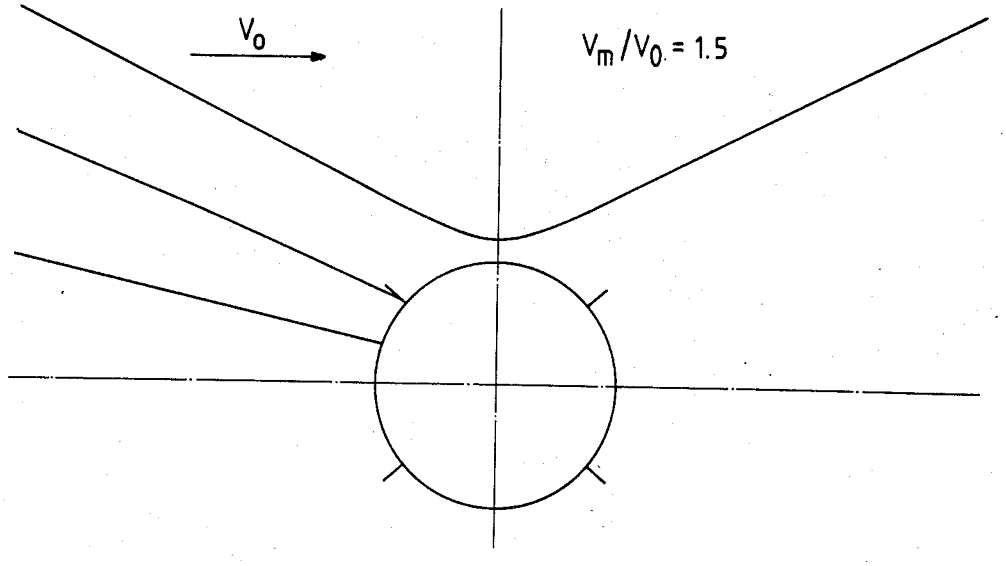
Figure 7:
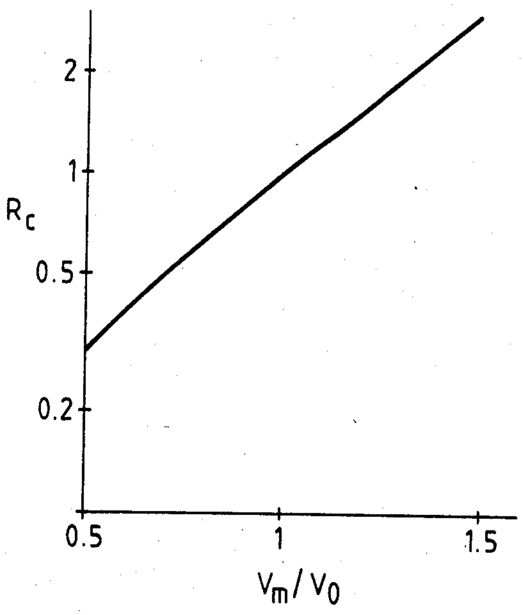

Again the trajectories only depend upon $V_m/V_o$. An interesting case occurs when $V_m/V_o=1$ then $dx_a/dt=O$. Thus all the trajectories are the lines $x_a=$const. which means that the capture radius is equal to the geometrical radius of the wire. Typical sets of trajectories are shown in FIGS. 5 and 6. As can be seen the trajectories are symmetrical about the y axis. Following the method for $H_o||V\theta$ values $x_{lin}(+)$ and $x_{lin}(-)$ can be introduced, $R_c=|X_{lin}(+)|+|X_{lin}(-)|$. Here all the capture is on the lower side of the wire facing the flow. The capture radius $R_c$ is plotted versus $V_m/V_o$ in FIG. 7.

If the current is reversed to flow in the negative Z direction then in equation (10) $V_m$ should be replaced by $-V_m$. In this case capture occurs on the near side of the wire.

Figure 8:
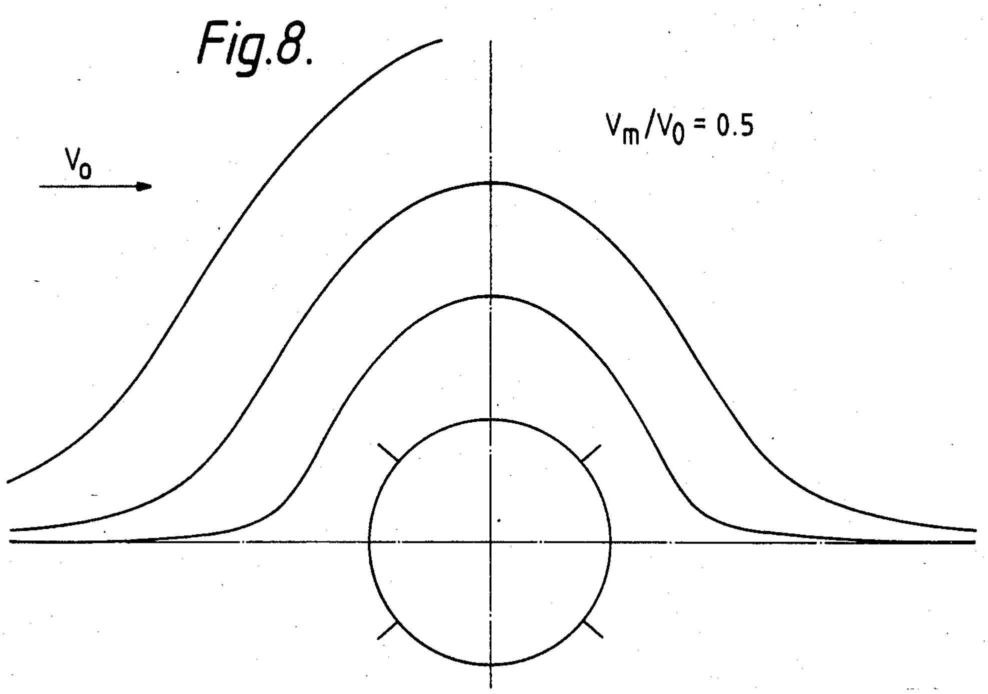

In FIG. 8 typical trajectories are shown for this case and as can be seen the capture radius in this case is practically given. This is the same for all values of $V_m/V_o$.

Figure 9:
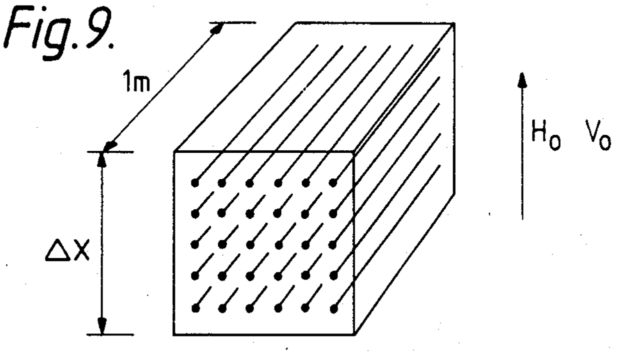
FIG. 9 shows a separator bed.

The separator then consists of an ordered set of parallel wires set perpendicular to the applied field. The actual construction of the filter in practice will be discussed below but at this point it is convenient to introduce a separator bed as shown in FIG. 9.

If the filling factor, the fraction space occupied by the wires, is $(1-\epsilon_o)$ and the average separation between the wires is l, then $1-\epsilon_o=\pi a^2/l^2$. The total length of wire in a thickness $\Delta x$ of unit cross-sectional area of the bed is $\Delta x/l^2=(1-\epsilon_o)dx/\pi a^2$. The total cross-section presented to the flow by the element of thickness dx of unit cross-sectional area is $2R_c\cdot(1-\epsilon_o)\pi a$. If a slurry of concentration C(x) and velocity $V_o$ is incident over unit cross-sectional area onto this element of the bed, the increase in concentration $O^2$ $-d(C(x)/dx=2C(x)R_c(1-\epsilon_o)dx/\pi a$. For a filter bed of length L in the x direction, provided the wires are randomly placed, the relation between the inlet concentration C(o) and the outlet concentration C(L) is given by $$C(L)+C(O)\exp(-2R_c(1-\epsilon_o)L/\pi a) \quad (11)$$

The derivation of equation (11) follows the argument present by Watson in J.Appl.Phys. 44, No. 9, 4209–13 (1973) for the high gradient magnetic separator using ferromagnetic wires. Equations of this type are only valid under certain circumstances, namely when the filter is nearly clean and when the time at which C(o) and C(L) are taken is long compared to time taken for one filter volume namely $T=\epsilon_oL/V_o$. A more detailed treatment of the filter bed is not necessary for the purpose of this paper. This treatment would follow the treatment for the high gradient magnetic separator by Watson in IEEE Trans Magns. MAG-14, No.4, 240–5 (1978) using the methods of Herzig, Leclerc and Le Goff in Ind. and Eng. Chem. 62 (5), 8–35 (1970).

From equations (9) and (10) it is clear that $R_c$ and consequently, from equation (11), the performance of the separator only depends upon the ratio $V_m/V_o$. An examination of equation (8) shows that $V_m \alpha H_o$ and also I. The limitation on the current I is set by the power dissipation in the matrix, but an advantageous increase in processing rate can be achieved by an increase of H with superconducting magnets.

The value of I is set by some acceptable value of power dissipation P unit volume which is given by $$P=\rho(1-\epsilon_o)(I/\pi a^2)^2 \quad (12)$$

In accordance with the invention, various considerations have to be taken into account in respect of the operation of the matrix of current carrying wires in the field provided by a superconducting magnet. The magnet can be operated in the persistent mode which removes the need for external current once the magnetic field has been established. A dewar system can be provided where the very low heat leak ensures a very low helium boil off. Essentially two conditions must be maintained.

1. The forces exerted on the magnet must be small so that the suspension holding the magnet in its cryogenic environment does not provide a large heat path.

2. Persistent mode operation.

Both of these conditions are achieved by this system. Essentially the first is achieved by using wires in pairs so that the forces on the matrix balance to zero. The second can be achieved provided there are no forces on the magnet under steady current in the matrix, which is achieved in the first condition, but also if there are no transient loads when the current in the matrix is changed. It is therefore necessary to have a very low mutual inductance between the matrix and the magnet. It is also very desirable to have a very low self inductance in the matrix configuration, which will be discussed below.

The purpose of persistent mode operation is to reduce the refrigeration costs, that is both capital and running costs.

With the matrix carrying a current and with the magnetic field switched on and in the persistent mode a suspension of particles is fed to the matrix. The suspending fluid can be gaseous or liquid (in the case of gaseous suspension the inertial term should be included in the equations of motion which leads to an increase in $R_c$ for a given value of $V_m/V_o$). Capture of particles begins but as the particles build up on the wires the efficiency of the wires for capture decreases. At some particular value of C(o)/C(L) which occurs after a number of canister volumes $V_o$ have been processed, the matrix must be cleaned in order to regenerate the capturing ability. The point at which this occurs depends upon the process itself and the desired improvement or recovery of material. If the slurry being processed is valuable it is necessary to displace the remaining canister slurry from the canister. This is done at the same value $V_o$ for the velocity and it can be assumed that $n_l$ canister volumes are taken to accomplish this displacement. In this system the force between the particles and the wires is removed simply by switching off the current I in the matrix. If the self inductance is small and the mutual inductance between the superconducting coil and the matrix is small, the switching can be done quickly. In practice this switching can be done in very much less than one second. The material can be washed from the matrix when the force is zero and from the time current is switched off to the time when it is restored is called the dead time.

The processing rate P/unit feed area of the system $$P = C_oV_o\sim\bar{R}\left(\frac{N_o}{N_o+N_1+\delta/T}\right) \quad (13)$$

In equation (13) R is the recovery, that is, the fraction of valuable material recovered averages over the $N_o$ canister volumes. T is the time for one canister volume $$T=\epsilon_o L/V_o$$

With this system $\delta$ is essentially the time required to wash the matrix and, with the force really zero, it can be only a few seconds so that $\delta/T << 1$. The importance of this for HGMS systems has been considered previously in J. H. P. Watson, Proc. Int. Cryogenic Eng. Conf., Grenoble (1976) pp 223–6 (1976) and the same arguments apply here. This system using switched secondary poles dispersed throughout the feed volume very effectively uses all the magnet space for the separation process.

The slurry is fed at a high velocity with good recovery because $V_m \propto H_o$ the applied magnetic field.

Mechanically an important advantage of this machine is that there are no moving parts.

A disadvantage of this machine is that the matrix carrying a current may produce leakage currents into the water. The matrix must therefore be adequately insulated. The force between the particles and the wire is long range $1/r^2$ so that a thick layer of insulation can be used without an appreciable loss of force at the wire surface. When the suspending fluid is a gas, supposed non-conducting, the wire needs to be coated with a hard material to prevent the wear of the matrix. This is also true of the high gradient magnetic separator but there the loss of force at the surface is greater because the force is proportional to $1/r^3$.

One interesting other feature that may be of help in cleaning the matrix is to pass a small A.C. current. This will provide a force on the matrix at the same frequency. The frequency could be varied to provide optimum release. The slight disadvantage would be a small residual attractive force between the particles and the wires.

In accordance with the invention there are certain numerous designs of the matrix that can be used.

Figure 10:
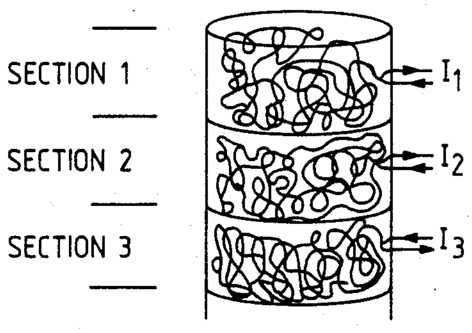
FIG. 10 shows a randomly packed matrix separator bed according to the invention.

The simplest and cheapest matrix is that of a randomly packed matrix shown schematically in FIG. 10. In such a matrix on the average only $\frac{2}{3}$ of the wire is orientated at right angles to the field $H_o$ and consequently the matrix is less effective. The orientations which occur are captured on a side of the wire, the side depending on the orientation of the current with respect to the field. It is also possible to have the randomness only in two dimension which are perpendicular to the flow in order to increase performance.

In order that no forces on the average are exerted on the matrix it is necessary to use a bifilar wire, that is, it is necessary to produce the matrix with a double wire carrying currents in opposite directions.

It is very useful to have the matrix consisting of a number of independent filters stacked together. Very useful things can be done with a separator where the force can be varied as a function of position in the separator, these will be discussed below.

Figure 11A:
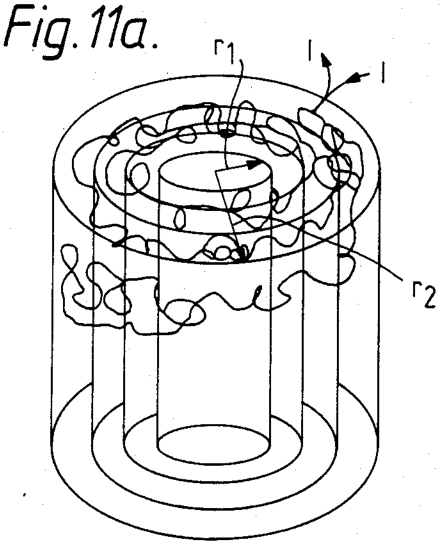
FIGS. 11*a* and 11*b* show a radial separator bed.
Figure 11B:
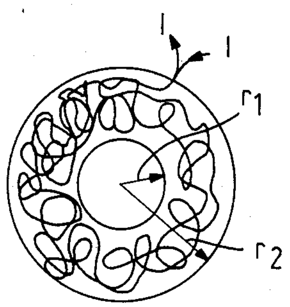

It is also possible to have a radial separator where the bifilar wires are randomly disposed between two radii $r_1$ and $r_2$ as shown in FIG. 11. In this system the flow rises up the central tube containing holes which result in a radial feed direction. The wires should be wound to follow the circumference of circles coaxial with the cylinders but be random with respect to the radius and position on the axis. Under these conditions capture is either on the front side or rear side facing the flow as near side capture is fairly ineffective only approximately half the wire is effective.

The radial feed system often has advantages when the dead time is short because the feed area is $2\pi r_\omega L$ which can often be much larger than A the cross-sectional area of the canister. The radial separator system is shown in FIG. 11.

Figure 12A:
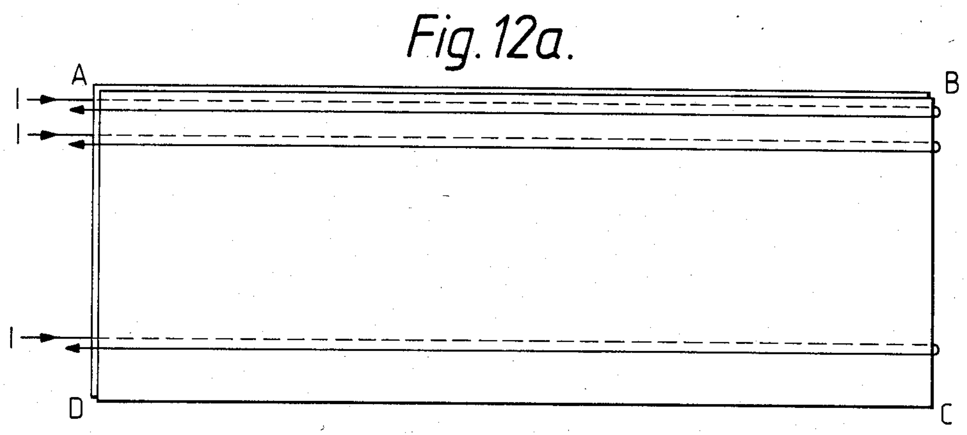
FIGS. 12*a* and 12*b* show a spiral separator bed.
Figure 12B:
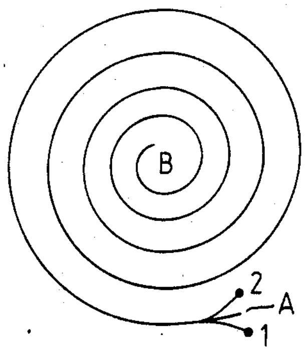

Other matrices can be used such as an ordered and spiral matrix as shown in FIG. 12. Bifilar strips are laid onto each side of a thin sheet, the sheet being wound as shown so that the current is fed along side 1 from end AD to end BC the current then returns along the other side. The sheet is then wound into a spiral as shown in FIG. 12(*b*). By a proper choice of current and field the sides of the wire exposed to the flow will be attractive. The field and the flow in this case should be parallel to AD and BC.

Another ordered but selective matrix may also be used. In this regard, from an examination of the equations of motion it has been established that one side of the wire, depending on the relative orientation of the current and the field, is attractive to paramagnetic material. The reverse side of the wire is attractive to diamagnetic materials.

Attempts have been made using selective washing with a magnetic fluid in order to separate tin and tungsten but the work was not very successful because of the difficulty alluded to above.

This selectivity is a very important feature in this current carrying matrix system.

Certain specific mineral separation problems may be overcome using the invention, for instance consider a mixture of four materials all in the neighbourhood of 100–200 μm esd, one ferromagnetic, two paramagnetic and a background gangue which is largely diamagnetic. With this system two passes are necessary.

The matrix should be in the form shown in FIG. 11 but the construction should be like FIG. 10 in the sense that a number of independent sections can be used.

The current $I_1$, in the first section can be chosen with a low value sufficient to capture only the ferromagnetic component, however, if appreciable amounts of ferromagnetic material are captured the matrix may begin to capture paramagnetic particles by HGMS processes.

The currents $I_2$, $I_3$ etc. should be large enough to capture the material of interest that is the paramagnetic material in sections 2, 3 and 4 etc. This material is released by switching off the current $I_2$, $I_3$ etc. but leaving $I_1$ on. After the paramagnetic material has been recovered the ferromagnetic material is recovered when $I_1$ is switched off.

The paramagnetics can be separated using a magnetic fluid and the selective matrix.

(c) For a particular example consider the following

In order to set the numerical limits consider a particle of radius 100 μm and with susceptibility $10^{-4}$ (SI units). Take the background field as 5 T, the wire radius $a = 200$ μm, the current in the wire 1 amp and the viscosity of the fluid $10^{-3}$ Pa −sec. The magnetic velocity $V_m = 4.44$ mm/sec and the power dissipation in the matrix is 56 kW/m. For a canister system of radius 0.5 m and 1 m long, the power dissipation would be 44kW. The temperature rise produced in the slurry, assuming $V_o = 2V_m$, is 7° C. Under these conditions the capture $R_c, \simeq \cdot 2$ so, for a system lm long with the matrix occupying 5% of the recovery, $(C(O) - C(L))/C(O) = 1$. Actually the slurry velocity could be appreciably greater than this with high recovery at this particular size. Also a reduction in current by a factor of 2 reduces the power dissipation in the matrix by a factor of 4, again recovery would still be in excess of 99%.

The processing rate can be estimated by taking a typical slurry of 25% solids with density of the particles 2.6 gm/cm of which 10% of the particles are extracted.

If the capacity of the matrix is taken to the volume equal to 2× that of the matrix itself then be capacity of the matrix is 204 kgm. If we assume 30 sec are required to clean the matrix then the duty factor is 0.8 and processing rate W=7.2 tonne/hr or the recovered material =0.72 tonne/hr.

If a similar material is treated in air then the magnetic velocity is appreciably higher $V_m=0.22$ m/s due to the lower viscosity of air $\eta=2.10^{-5}$ Pa-s. If it is assumed that the loading in air is 0.1 gm/cm then the feed time is 60 sec and taking the dead time D=10 sec gives a duty factor $\delta=0.8$ which leads to a processing rate W=28 tonne/hr and a recovered mass =2.8 tonne/hr. Again it has been assumed that $V_o=2\ V_m$ and the capacity of the matrix is 204 kgm.

The advantages of the invention over known prior art separators will now be considered.

A separator has been suggested by Parker in IEEE Trans. Magns, MAG-17, No. 6, 2816–18 (1981) in which a wire matrix carries a current. The difference between the invention and Parker's, is that in Parker's, no background magnetic field is applied. It is possible to define a magnetic velocity which can be denoted by $V_m(H_o=O)$ and Parker gives $$V_m(H_o=O)=2\mu_o(\chi b^2)(I/2\pi)^2/9\eta a^3 \qquad (14)$$

The expression for the power dissipation in the matrix is the same as in this paper given by equation (12). The magnetic velocity plays the same role as in this work so that it is interesting to examine the ratio of the two magnetic velocities $V_m/V_m\ (H_o=O)$.

$$V_m/V_m(H_o=O)=2\pi H_o a/I \qquad (15)$$

If we take $H_o=3.98\ 10^6$ amp/m(≡5 T) then for $V_m/V_m(H_o=O)=1$, $a=2.513\ 10^{-6}I$. Even with I=10A, a =$2.513\ 10^{-6}$m. The power dissipation would be p/m $P/m^3=2.5\ 10^3$ GW which is a very large power. In the operating region considered in the last section $V_m/V_m\ (H_o=O)\simeq 10^3$, that is the processing velocity of the device considered here is about $10^3$ greater than the matrix which relies on current alone at the same power dissipation.

Figure 13:
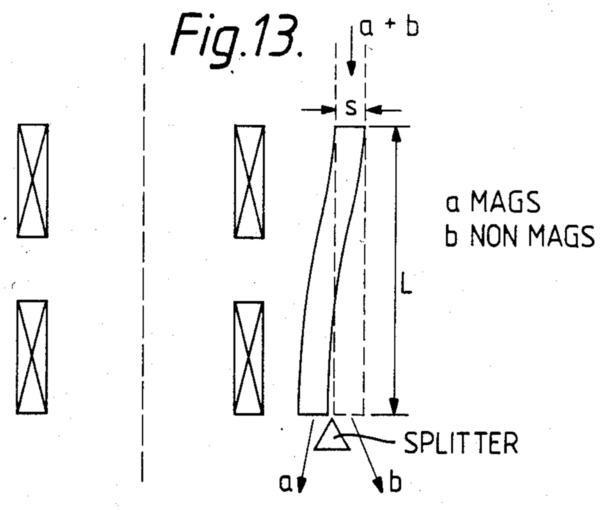
FIG. 13 shows an open gradient magnetic separator.

In an open gradient system the field gradient is produced by using specially shaped superconducting windings. Cohen and Good, IEEE Trans. Magn. MAG-12 552 (1975) have used superconducting quadupoles but later designs have used superconducting linear multipole systems. In all these systems the material to be separated is allowed to fall in an annular curtain through the field gradient. The particles suffer a deflection depending on their magnetic susceptibility and size and can be collected into different boxes. This system is effective within the same particle size range as the new method described in the paper. The arrangement is shown schematically in FIG. 13.

The difficulty with the open gradient system is that only a small fraction of the annular space of the coil system can be used. This is for three reasons. The first is the BdB/dx is only large over a small radial fraction. If the field gradient is large the value of the field itself drops to a low value in a small radial distance. Essentially the annular falling curtains can only be established in fairly narrow radial increments inside and outside the coil system. The second reason is that the curtain thickness S cannot be too great because twice the thickness at least must be allowed to separate the curtain radially into the separation boxes. The third reason is that if the falling curtain is too thick interparticle collisions within the curtain become an important factor reducing the selectivity of the process.

Kopp, Int. J. of Mineral Processing, 10, 297–308 (1983) has analysed the performance of the 'falling curtain' open gradient system in which he has used a simple kinetic model to allow for inter-particle collisions. Using the expressions derived by Kopp it is possible to give an upper estimate of the processing rate of the open gradient system for the same mineral problem with the same conditions outlined in Section 4.1. It is assumed that the 100 μm particles pass through the separation zone at their terminal velocity. The superconducting solenoid is assumed to be 1 m in diameter with a separation channel inside and a separation channel outside. Under these conditions the processing rate is 12 tonne/hr.

The processing rate of this type of system is not greatly improved by increasing the size of the system or the size of the field unlike the current carrying matrix separator.

The big advantage that the new system offers over open gradient system is that the whole space inside the coil can be used for separation and the processing rate of the system is directly proportional to the field. Consequently for a machine of the order of 1 m diameter separating particles near 100 μm diameter the new separator can have several times the processing rate of the open gradient system.

What I claim is:

1. A magnetic separator for separating relatively magnetic particles from relatively non-magnetic particles comprising a magnet providing a uniform magnetic field and current carrying wire means dispersed in said field such that relatively magnetic particles are captured by said wire during passage of a capture current therethrough.

2. A magnetic separator as claimed in claim 1 wherein said current carrying wire means comprises at least a pair of wires.

3. A magnetic separator as claimed in claim 2 wherein one wire of said pair carries capture current in one direction while the other wire of said pair carries capture current in an opposite direction.

4. A magnetic separator as claimed in claim 1 wherein there is a very low mutual inductance between said current carrying wire means and said magnet.

5. A magnetic separator as claimed in claim 1 wherein said current carrying wire means has very low self inductance.

6. A magnetic separator as claimed in claim 1 wherein the capture current to said current carrying wire means in periodically switched off.

7. A magnetic separator as claimed in claim 6 wherein a small A.C. current is carried by said current carrying wire means when said capture current is switched off.

8. A magnetic separator as claimed in claim 1 wherein said current carrying wire means is in the form of a matrix having randomly packed wires.

9. A magnetic separator as claimed in claim 1 wherein said current carrying wire means is in the form of an ordered set of parallel wires.

10. A magnetic separator as claimed in claim 1 wherein said current carrying wire means is in the form of a radial matrix.

11. A magnetic separator as claimed in claim 1 wherein said current carrying wire means is in the form of a spiral matrix.

12. A magentic separator as claimed in claim 1 wherein said current carrying wire means is split into sections, through which sections different currents are carried.

13. A magnetic separator as claimed in claim 1 wherein said current carrying wire means is insulated.

14. A magnetic separator as claimed in claim 1 wherein said current carrying wire means is coated with wear resistant material.

15. A magnetic separator as claimed in claim 1 wherein said magnet operates in a persistant mode.

16. A magnetic separator as claimed in claim 1 wherein said magnet is a superconducting high gradient magnet.

* * * * *